3,159,762
CORE CONSTRUCTION

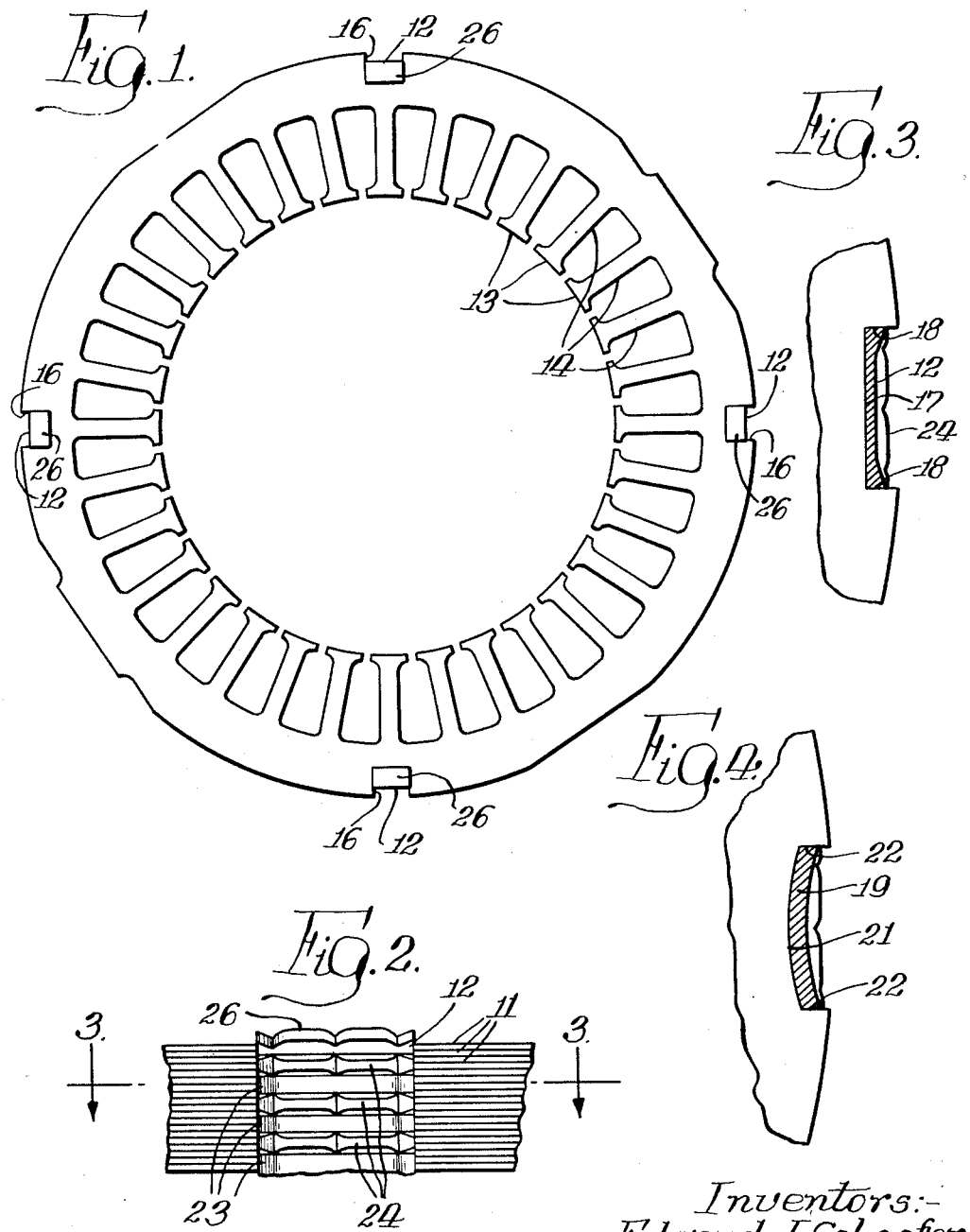

William E. Haifley, Edward J. Schaefer, and Lee J. Lakes, Bluffton, Ind., assignors to Franklin Electric Co., Inc., Bluffton, Ind., a corporation of Indiana
Original application Dec. 30, 1958, Ser. No. 783,987. Divided and this application May 5, 1960, Ser. No. 27,172
9 Claims. (Cl. 310—217)

This application is a division of our copending application titled Core Construction for Electric Machines, Serial No. 783,987, filed December 30, 1958.

The invention relates to the manufacture of laminated cores for electric machines and more particularly to a novel form of laminated core.

It is a primary object of the present invention to provide a novel laminated core that has excellent magnetic characteristics, is tight and rigid, and is relatively inexpensive to manufacture.

Another object is to provide a novel laminated stator core for electric motors.

Other objects and advantages of the invention will be apparent from the following description taken in conjunction with the accompanying drawing, wherein FIG. 1 is an end view of a laminated core embodying the features of the present invention;

FIG. 2 is an enlarged elevational view of a portion of the edge of the core shown in FIG. 1;

FIG. 3 is a sectional view taken along line 3—3 in FIG. 2; and

FIG. 4 is a view similar to FIG. 3 showing a modified form of the invention.

A core structure for an electrical machine such as a motor usually comprises a plurality of laminations held in superimposed face-to-face stacked relation by longitudinally extending banding-strip material. The laminations are each provided with one or more generally rectangular slots in their peripheral edges. When the laminations are assembled, the slots are aligned and form one or more grooves. Each groove extends from one end of the stack to the other, and mounted in each groove is an associated banding strip which has its opposite ends bent over the ends of the stack of laminations. Each banding strip is in longitudinal tension between its bent ends and also each banding strip is deformed in its associated groove so that the banding strip is in lateral compression between the side walls of its associated groove for tightly gripping the laminations.

The present invention provides banding strips of the foregoing character, which have alternating transversely extending depressed areas and ribs. The strip may be deformed in such a manner as to thicken it at its side edges, particularly in the depressed areas, so that it firmly grips the laminations to hold them in assembled relation.

Apparatus for assembling cores embodying this invention is shown and described in the aforementioned copending application, Serial No. 783,987. The apparatus includes structure for holding a stack of core laminations in aligned face-to-face compressed relation with the slots in the edges of the laminations forming one or more banding strip receiving grooves. The apparatus also includes structure for supporting a strip of banding material and for laying the strip in the groove upon relative movement between the two structures. The last mentioned structure includes deforming means, such as a serrated roller, adapted to flatten and deform the strip in the groove into holding engagement with the laminations. The banding material is preferably supplied to the apparatus as a continuous strip of flat banding stock, and the apparatus also includes means for preforming the strip, as well as a device for severing or cutting the assembled strip from the remainder of the banding material after banding has been accomplished. The cutting device prepares the end of the remaining portion of the banding strip for the next banding operation. Consequently, the apparatus is adapted to carry out each banding operation quickly and automatically and is thus able to mass produce electrical cores of the preferred form, thereby reducing manufacturing costs.

FIGS. 1, 2 and 3 of the drawing show a stator core for an electric motor, embodying the features of the present invention. The core comprises a plurality of laminations 11 held in superposed stacked relation, in this instance, by four circumferentially spaced banding strips 12. The laminations 11, in this instance, are generally annular identically shaped sheets of magnetic material. The inner periphery of each laminaion is formed in the conventional manner to provide a plurality of circumferentially spaced pole portions, indicated at 13. The pole portions 13 define slots 14 therebetween adapted to accommodate the stator field windings. The inner ends of the pole portions 13 define a circular opening adapted to accommodate the rotor (not shown) of the motor. The outer periphery of each lamination is generally circular so that the core formed thereby may be mounted in a circular motor frame (not shown), but is provided with four circumferentially spaced generally rectangular slots in the edge of each lamination. Thus, when the laminations 11 are stacked in aligned face-to-face relation, as shown, the aligned slots form four banding strip receiving grooves 16 which extend the length of the core.

The banding strip receiving grooves are generally rectangular in cross section and may be deeper in the center than at their side edges. As shown in FIG. 3, the groove 16 has a flat-bottom wall 17 and perpendicular side walls 18. In FIG. 4, a modified form of banding strip 19 is shown, which is mounted in a modified form of groove having an arcuate bottom wall 21 and side walls 22 which are perpendicular to the chord across the arc of the bottom. The advantages of the different forms shown in FIGS. 3 and 4 will be discussed hereinafter.

Prior to being mounted in their associated grooves, the banding strips 12 and 19 are preferably longitudinally corrugated so that they are narrower than their associated grooves and thus may be readily placed in the grooves. Upon being placed in these grooves, the banding strips 12 are then flattened and deformed in the grooves. Thus, the strip 12 is compressed tightly against the bottom wall 17, and at longitudinally spaced areas the metal of the strip is forced laterally to thicken the edge portions of the strip and force it against the side walls 18, so that the strip is in compression between the side walls. The thickened edges of the strip provide a firm grip on the laminations. In FIG. 2, the depressed areas are shown at 23 and are longitudinally spaced and generally concave. Between the depressed areas 23 are laterally extending ribs or portions 24 that are corrugated longitudinally of the strip 12, such corrugating remaining from the original corrugation of the strip.

The opposite ends of the strips 12 are bent over the opposite end laminations of the stack, as shown at 26 in FIGS. 1 and 2. The bending is accomplished when the stack of laminations is compressed. Thus, the strips 12 are in tension between their bent ends 26 and hold the stack of laminations compressed.

The modified form of banding strip 19 shown in FIG. 4 differs from the strip 12 in that it is deformed in a groove having the arcuate bottom 21. This results in the center portion of the strip 19 being in an over-center relationship. The exposed surface of the strip 19 has the same general appearance conformation as the strip 12, that is, it has generally concave depressed areas alternating with longitudinally corrugated ribs. Because of the over-center relation of its center portion with respect to its side or edge portions, and because the strip is curved and hence has substantially the same areas of contact with the sides 22 of the groove as in the previous form, the strip 19 has an increased holding effect on the stack of laminations.

From the foregoing it is apparent that the present invention provides an improved form of laminated core structure for electrical machines including electric motor. The core is easily assembled, may be of any reasonable length, is rigid, and has excellent electrical characteristics.

We claim:

1. In combination, a stack of laminations superimposed in face-to-face relation, said stack having a groove across the edges of the respective laminations, said groove being generally rectangular in cross section, and an elongated strip of banding material positioned in said groove and having alternating transversely extending depressed areas and ribs on the top surface thereof, the bottom surface of said strip in said areas conforming to and in tight frictional engagement with said bottom wall; and the opposite side edges of said strip in said areas being compressed against said side walls.

2. The combination according to claim 1, in which said ribs are corrugated longitudinally of the strip.

3. The combination according to claim 1, in which said areas are concave transversely of the strip.

4. In combination, a stack of laminations superimposed in face-to-face relation said stack having a groove across the edges of the respective laminations, said groove having an arcuate bottom wall deeper along the center line of the groove than at the sides thereof and having side walls substantially perpendicular to a chord across the arc, and an elongated strip of banding material having a bottom surface conforming to and in tight frictional engagement with said bottom wall at longitudinally spaced areas and having opposite side edges compressed against said side walls in said longitudinally spaced areas.

5. The combination of claim 4, in which the strip at said longitudinally spaced areas is arcuate in cross section.

6. The combination of claim 5, in which the arcuate shape of said depressed longitudinally spaced areas provides increased areas of contact with the side walls of the groove.

7. In combination, a stack of laminations superimposed in face-to-face relation, said stack having a groove across the edges of the respective laminations, said groove being generally rectangular in cross section, and an elongated strip of banding material positioned in said groove and having alternating transversely extending depressed areas and ribs on the top surface thereof, the bottom surface of said strip in said areas conforming to and in tight frictional engagement with said bottom wall, and the opposite side edges of said strip in said areas being compressed against said side walls, the strip in the space between said areas being longitudinally corrugated.

8. In combination, a stack of laminations superimposed in face-to-face relation, said stack having a groove across the edges of the respective laminations, said groove being generally rectangular in cross section, and an elongated strip of banding material positioned in said groove and having alternating transversely extending depressed areas and ribs on the top surface thereof, the bottom surface of said strip in said area conforming to and in tight frictional engagement with said bottom wall, and the opposite side edges of said strip in said area being compressed against said side walls, said strip at said areas being thicker at the side edges of the strip than in the center portion of said strip.

9. In combination, a stack of laminations superimposed in face-to-face relation, said stack having a groove across the edges of respective laminations, said groove being generally rectangular in cross section, and an elongated strip of banding material positioned in said groove and having alternating transversely extending depressed areas reduced on the top surface thereof, the bottom surface of said strip in said area conforming to and in tight frictional engagement with said bottom wall, and the opposite side edges of said strip in said areas being compressed against said side walls, said bottom wall of the groove and the bottom surface of said strip being substantially flat and in engagement in said areas, and the edge portions of the strip being thicker than the center portion of said strip in said areas.

References Cited in the file of this patent

UNITED STATES PATENTS

| | | |
|---|---|---|
| 2,574,417 | Rowe | Nov. 6, 1951 |
| 2,610,225 | Korski | Sept. 9, 1952 |
| 2,849,695 | Schaefer | Aug. 26, 1958 |

FOREIGN PATENTS

| | | |
|---|---|---|
| 723,521 | Great Britain | Apr. 16, 1951 |